(12) United States Patent
Morandi et al.

(10) Patent No.: US 12,510,245 B2
(45) Date of Patent: Dec. 30, 2025

(54) BURNER ASSEMBLY FOR A STEAM PRODUCTION BOILER ASSEMBLY AND METHOD FOR OPERATING SAID BURNER ASSEMBLY

(71) Applicant: SOFINTER SPA, Milan (IT)

(72) Inventors: Lorenzo Morandi, Milan (IT); Marzio Ferrara, Milan (IT)

(73) Assignee: SOFINTER SPA (IT)

( * ) Notice: Subject to any disclaimer, the term of this patent is extended or adjusted under 35 U.S.C. 154(b) by 406 days.

(21) Appl. No.: 18/112,805

(22) Filed: Feb. 22, 2023

(65) Prior Publication Data

US 2023/0332770 A1    Oct. 19, 2023

(30) Foreign Application Priority Data

Feb. 28, 2022   (IT) ........................ 102022000003683
Feb. 28, 2022   (IT) ........................ 102022000003722

(51) Int. Cl.
*F23D 14/24*    (2006.01)
*F23D 17/00*    (2006.01)
*F23N 1/00*     (2006.01)

(52) U.S. Cl.
CPC ............. *F23N 1/002* (2013.01); *F23D 14/24* (2013.01); *F23D 17/002* (2013.01); *F23D 2204/10* (2013.01)

(58) Field of Classification Search
CPC ........ F23N 1/002; F23D 14/24; F23D 17/002; F23D 2204/10

(Continued)

(56) References Cited

U.S. PATENT DOCUMENTS 3,180,395 A * 4/1965 Reed ....................... F23D 11/00
                                            431/283
4,835,971 A * 6/1989 Romey ................. F23D 11/107
                                            239/416.5

(Continued)

FOREIGN PATENT DOCUMENTS

AU    2012243778 A1   10/2013
DE       1551827 A1    9/1970

(Continued)

OTHER PUBLICATIONS

Office Action issued in corresponding European Patent Application No. 23 158 801.3 on Aug. 27, 2024.

*Primary Examiner* — Avinash A Savani
(74) *Attorney, Agent, or Firm* — The Belles Group, P.C.

(57) ABSTRACT

A burner assembly for a boiler unit for the production of steam extends along a longitudinal axis and comprises:
  a plurality of fuel conduits in which, in use, at least one fuel flows in a forward direction;
  a plurality of fuel injection nozzles, connected to respective fuel ducts for discharging, in use, fuel into a combustion chamber of the boiler unit;
  a first manifold connected to a first group of fuel conduits and to a first fuel source by means of a first supply line provided with a first regulating valve;
  at least one second manifold connected to a second fuel line assembly and to a source of a second fuel by means of a second supply line provided with a second regulating valve; and
  a control device configured for adjusting the first regulating valve and the second regulating valve based on the energy demand of the boiler unit and based on at least one characteristic parameter of the first fuel and/or the second fuel.

24 Claims, 6 Drawing Sheets

(58) Field of Classification Search
USPC .......................................................... 431/89
See application file for complete search history.

(56) References Cited

U.S. PATENT DOCUMENTS

| | | | | |
|---|---|---|---|---|
| 5,833,447 | A | * | 11/1998 | Bodelin .................. F23D 14/22 |
| | | | | 431/174 |
| 5,984,667 | A | * | 11/1999 | Philippe .................. F23D 14/22 |
| | | | | 431/165 |
| 2005/0097895 | A1 | * | 5/2005 | Kothnur .................. F23N 1/002 |
| | | | | 60/776 |
| 2007/0089485 | A1 | | 4/2007 | Antel et al. |
| 2010/0050912 | A1 | * | 3/2010 | Mersmann .............. F23N 5/082 |
| | | | | 431/89 |
| 2017/0082291 | A1 | | 3/2017 | Horikawa et al. |
| 2018/0224122 | A1 | * | 8/2018 | Mimura .................. F23D 14/66 |
| 2020/0032998 | A1 | | 1/2020 | Brhel |
| 2020/0191385 | A1 | | 6/2020 | Carroll et al. |

FOREIGN PATENT DOCUMENTS

| | | | |
|---|---|---|---|
| EP | 2481986 | A2 | 8/2012 |
| EP | 2126471 | A2 | 12/2019 |
| EP | 3940293 | A1 | 1/2022 |
| JP | 2015004483 | A | 1/2015 |

\* cited by examiner

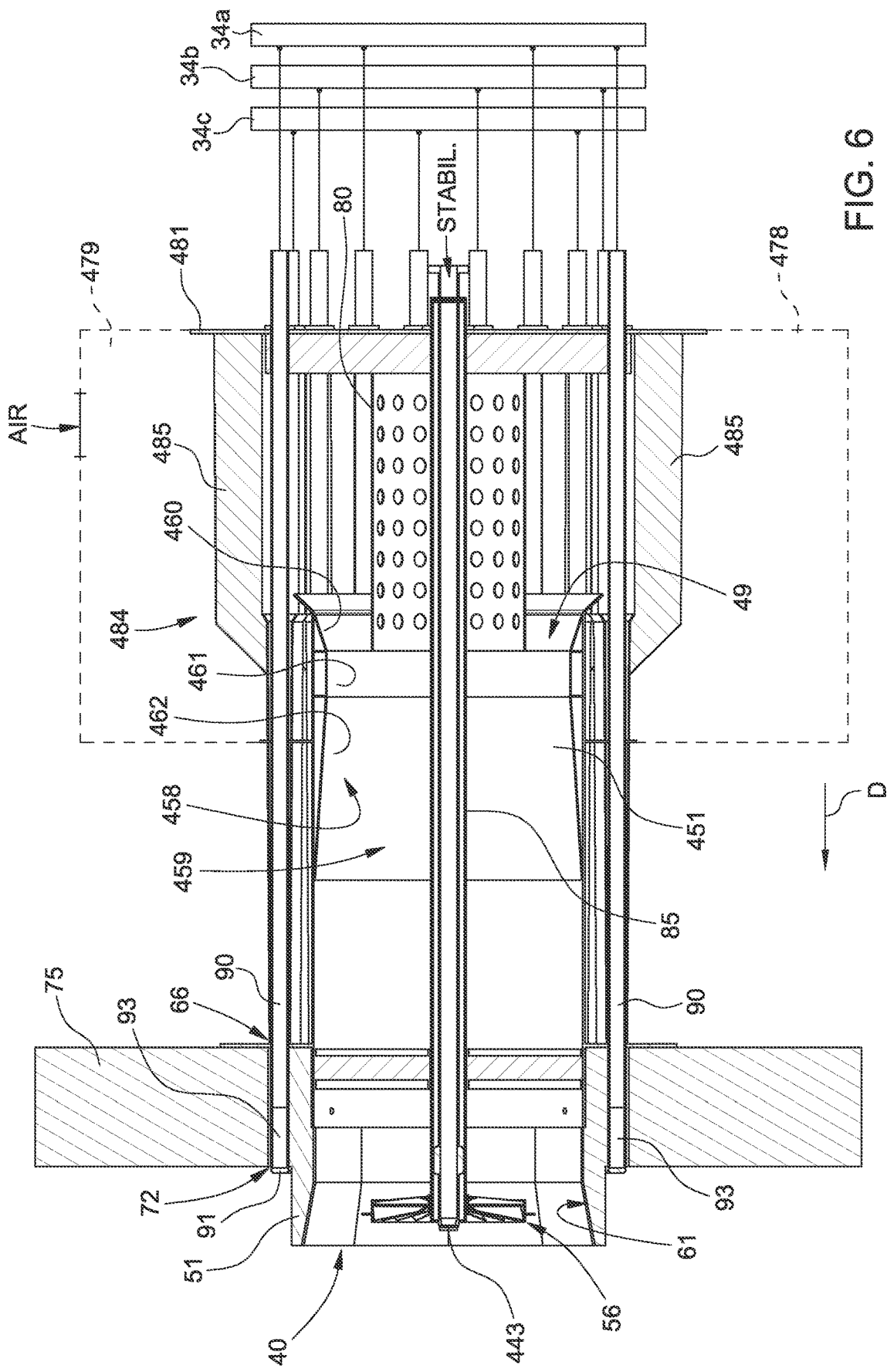

BURNER ASSEMBLY FOR A STEAM PRODUCTION BOILER ASSEMBLY AND METHOD FOR OPERATING SAID BURNER ASSEMBLY

CROSS-REFERENCE TO RELATED APPLICATIONS

This patent application claims priority from Italian patent applications no. 102022000003683 and no. 102022000003722 both filed on Feb. 28, 2022, the entire disclosure of which is incorporated herein by reference.

TECHNICAL FIELD

The present invention relates to a burner assembly for a boiler unit for steam generation and to a method for operating said burner assembly.

BACKGROUND

The growing attention to air pollution and climate change on a global scale, confirmed by the COP26 protocols, requires, along with an acceleration of the energy transition towards renewable energy sources, a reduction in the use of fossil fuels.

Global emissions of nitrogen oxides are expected to fall by 10% by 2040, so both a significant reduction of the emissions and high efficiency are crucial to meet market demands in terms of cost and sustainability.

The need to reduce greenhouse gas emissions in a context of increasing steam demand for process/industrial applications is therefore leading to the development of a new generation of burners capable of accompanying and promoting the energy transition from fossil to renewable and waste fuels.

Next-generation burners will need to be able to burn several fuels with high efficiency and low emissions.

The fuels available may vary depending on availability and range from natural gas to gases with different compositions and/or low calorific value (e.g. flare gas, biogas, etc.), up to pure hydrogen or mixed in a variable percentage with other gases.

SUMMARY

It is therefore an aim of the present invention to provide a burner assembly which is capable of burning a wide range of gases at high efficiency and which is capable, at the same time, of keeping emission levels below legal limits.

In other words, it is an aim of the present invention to provide a burner assembly characterized by maximum flexibility in terms of fuel with which the burner assembly can be supplied, high thermal efficiency and low pollutant emissions.

In accordance with these aims, the present invention relates to a burner assembly for a boiler unit for steam generation; the burner assembly extending along a longitudinal axis and comprising:
  a plurality of fuel conduits into which, in use, at least one fuel flows in a forward direction;
  a plurality of fuel injection nozzles, connected to respective fuel conduits for discharging, in use, fuel into a combustion chamber of the boiler unit;
  a first manifold connected to a first group of fuel conduits and to a first fuel source by means of a first supply line provided with a first regulating valve;
  at least a second manifold connected to a second group of fuel conduits and to a source of a second fuel by means of a second supply line provided with a second regulating valve; and
  a control device configured to regulate the first regulating valve and the second regulating valve based on the energy demand of the boiler unit and based on at least one characteristic parameter of the first fuel and/or the second fuel.

Advantageously, the burner assembly according to the present invention is characterized by a high flexibility. This flexibility makes it possible to obtain excellent results in terms of efficiency regardless of the type of fuels supplied. The control device is, in fact, able to regulate the supply to the manifolds in real time in order to guarantee maximum efficiency under all operating conditions and compliance with pollutant emission limits.

A further aim of the invention is to provide a burner assembly characterized by high thermal efficiency and low pollutant emissions and by the maximum flexibility in terms of fuel with which the burner assembly can be fed.

In accordance with these aims, the present invention relates to a Burner assembly for a boiler for the production of steam; the burner assembly extending along a longitudinal axis and comprising:
  an air duct centred along the axis, into which, in use, air flows in a forward direction; the air duct being provided with an outlet discharging into a combustion chamber of the boiler unit;
  a plurality of fuel conduits in which, in use, at least one fuel flows in the forward direction;
  a plurality of fuel injection nozzles arranged around the air duct; each fuel injection nozzle being connected to an end portion of a respective fuel conduit for discharging fuel into the combustion chamber in use;
  the outlet of the air duct being arranged downstream of the fuel injection nozzles along the forward direction;
  the end portion of at least one fuel conduit being rotatable about its axis of extension.
  In the burner assembly according to the present invention, the injection of fuel takes place through the injection nozzles surrounding the air duct and are axially rearward with respect to the outlet of the air duct. In this way, the fuel injection zone and the air discharge zone are substantially separated. This allows the generation of an oxygen-lean combustion zone in the annular region surrounding the air duct.

The possibility of rotating the end portions of the fuel conduits allows a further adjustment of the injection direction, for example depending on the fuel injected.

For some types of fuel, it may be useful to adjust the injection direction by trying to move the injection zone further away from the air discharge zone. For other types of fuel, on the other hand, the exact opposite could be useful (i.e. to bring the injection zone closer to the air discharge zone).

BRIEF DESCRIPTION OF THE DRAWINGS

Further characteristics and advantages of the present invention will become clear from the following description of a non-limiting example of an embodiment thereof, with reference to the figures of the attached drawings, in which:

FIG. 6 is a sectional view, with parts removed for clarity's sake, of the burner assembly of FIG. 5.

DESCRIPTION OF EMBODIMENTS

Figure 1:
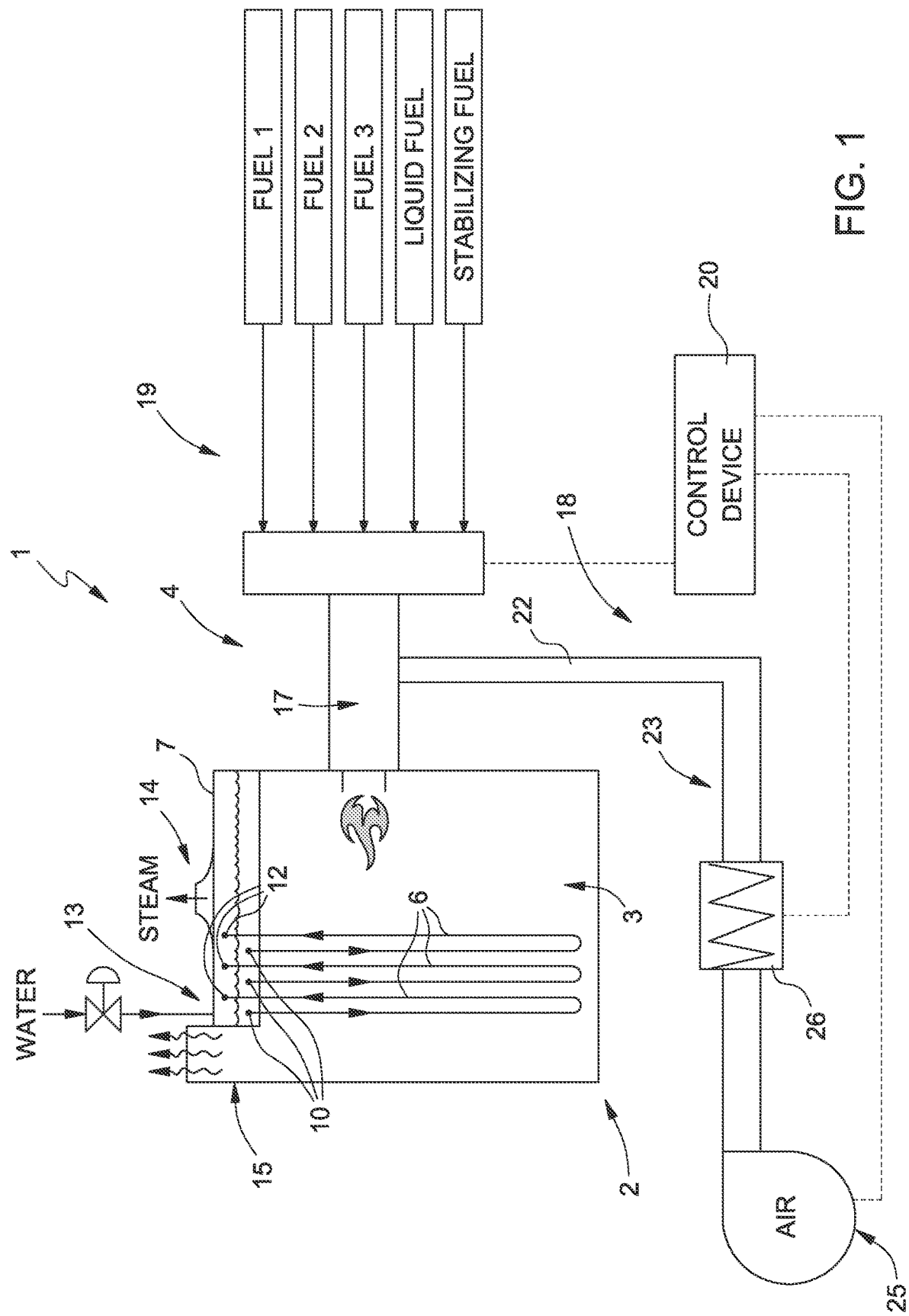
FIG. 1 is a schematic representation of a boiler provided with a burner assembly according to the present invention.

In FIG. 1, reference number 1 denotes a boiler unit for steam generation.

The boiler unit 1 comprises a boiler 2 configured to generate steam and provided with a combustion chamber 3, at least one burner assembly 4, a plurality of evaporation ducts 6 (only some of which are schematically represented in the accompanying figures), and at least one cylindrical body 7.

The evaporation ducts 6 extend into the combustion chamber 3. Each evaporation duct 6 is provided with a water inlet 10 and with a steam outlet 12.

The cylindrical body 7 is connected to the water inlet 10 and to the steam outlet 12 of each evaporation duct 6 and is further provided with an inlet 13 for receiving water to be supplied to the evaporation ducts 6 through the water inlets 10, and with an outlet 14 through which the steam coming from the evaporation ducts 6 flows through the steam outlets 12.

In use, the burner assembly 4 heats the combustion chamber 3; the water in the cylindrical body 7 is supplied to the evaporation ducts 6 and transformed into steam by exploiting the heat present in the combustion chamber 3.

The steam generated by each evaporation duct 6 is discharged into the cylindrical body 7, and then escapes through the outlet 14. The combustion fumes in the combustion chamber 3 are discharged into the atmosphere through a flue 15 after passing through the zone of the combustion chamber 3 in which the evaporation ducts 6 are arranged and, if provided, also an economizer (not shown).

In the non-limiting example described and shown herein, the boiler 2 comprises only one burner assembly 4.

The burner assembly 4 is provided with a burner body 17, an air supply system 18, a fuel supply system 19 and a control device 20.

Preferably, the air supply system 18 comprises an air supply duct 22 which connects the burner body 17 to an air supply line 23 and is configured to supply the burner assembly 4 with a certain air flow rate.

The air supply line 23 preferably comprises a fan 25 arranged at the inlet of the line and a heater 26 configured to heat the air before it reaches the burner body 17, if necessary.

The heater 26 and the fan 25 are adjusted by the control device 20.

Figure 2:
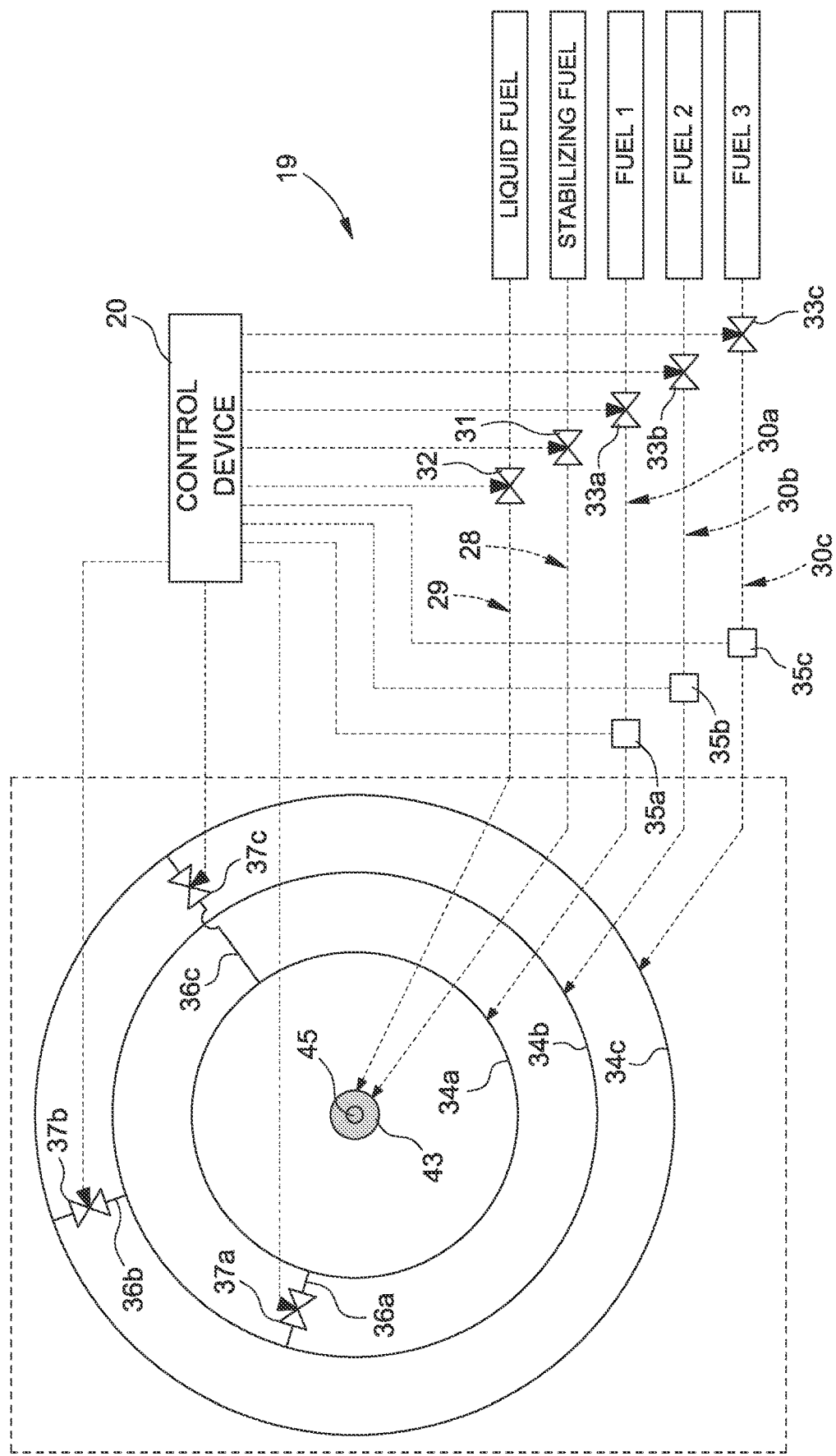
FIG. 2 is a schematic representation of a detail of the burner assembly according to the present invention.

With reference to FIG. 2, the fuel supply system 19 is configured to supply more than one fuel to the burner body 17. In the non-limiting example described and shown herein, the fuel supply system 19 comprises a stabilization line 28 (which supplies a stabilizing gas, such as natural gas or gas with known characteristics that are stable over time), a liquid fuel supply line 29 (if provided), and three fuel supply lines 30a 30b 30c.

In the non-limiting example described and shown herein, the three fuels supplied to the fuel supply lines 30a, 30b, 30c are preferably different from each other.

For example the three fuels supplied to the fuel supply lines 30a 30b 30c may be different in terms of provenance (e.g. they may come from different sources depending on current availability) or in terms of composition (e.g. they may comprise different percentages of hydrogen) or in terms of fuel type (e.g. flare gas, biogas, natural gas, hydrogen, etc.).

A variant not shown provides that at least two of the fuel supply lines 30a 30b 30c are supplied with the same fuel.

A variant not shown provides that the number of fuel supply lines is different from three, for example two or more than three, depending on the types of fuel available or depending on the flexibility required of the burner assembly 4.

With reference to FIG. 2, the stabilization line 28 is provided with a stabilizing fuel regulating valve 31, the liquid fuel supply line 29 is provided with a liquid fuel regulating valve 32, while each fuel supply line 30a 30b 30c is provided with a respective fuel regulating valve 33a 33b 33c.

The fuel supply system 19 further comprises a first manifold 34a connected to the fuel supply line 30a, a second manifold 34b connected to the fuel supply line 30b, a third manifold 34c connected to the fuel supply line 30c.

Preferably, the manifolds 34a, 34b and 34c are connected to each other.

In the non-limiting example described and shown herein, the fuel supply system 19 comprises a first connection line 36a which connects the first manifold 34a to the second manifold 34b, a second connection line 36b which connects the second manifold 34b to the third manifold 34c, and a third connection line 36c which connects the third manifold 34c to the first manifold 34a.

Each connection line 36a 36b 36c is provided with a respective connection valve 37a 37b 37c.

The stabilizing fuel regulating valves 31, the liquid fuel regulating valve 32, the fuel regulating valves 33a 33b 33c and the connection valves 37a 37b 37c are controlled by the control device 20. The control mode will be detailed below.

Figure 3:
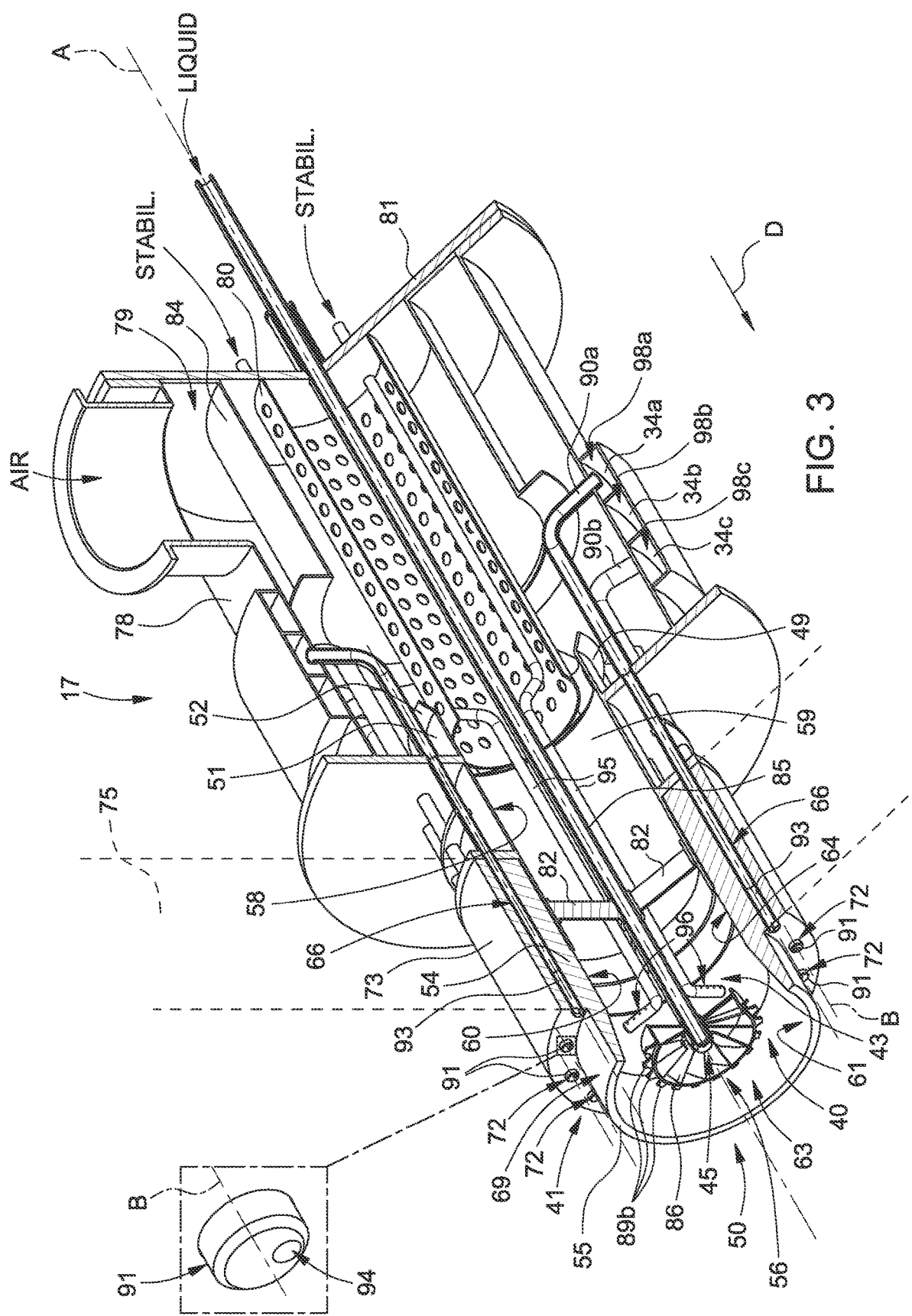
FIG. 3 is a perspective view, with parts in section and parts removed for clarity's sake, of a burner assembly according to the present invention.
Figure 4:
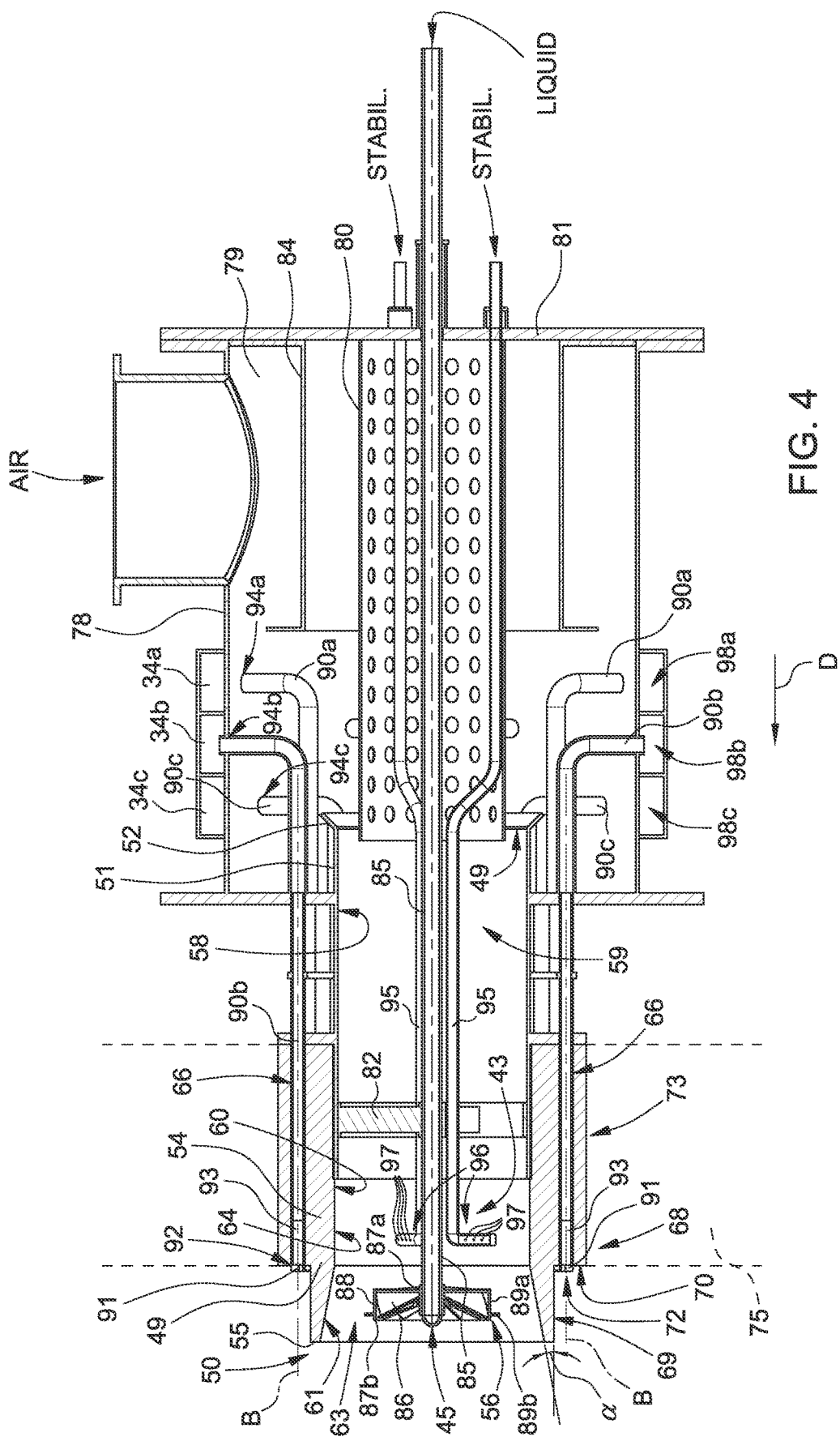
FIG. 4 is a sectional view, with parts removed for clarity's sake, of the burner assembly of FIG. 2.

With reference to FIG. 3 and to FIG. 4, the burner body 17 of the burner assembly 4 extends along a longitudinal axis A and comprises an air duct 40 centred on the axis A, a main burner 41, which extends around the air duct 40 and a stabilization burner 43, which is at least in part housed in the air passage duct 40. In the non-limiting example described and shown herein, the burner body 17 further comprises a liquid fuel lance 45, which is also arranged along the air duct 40.

As highlighted by the arrow in FIG. 3, air and fuel flow along the burner body 17 in a forward direction D.

The air duct 40 has an inlet 49 and an outlet 50. The air in the air duct 40, therefore, flows from the inlet 49 to the outlet 50.

The air duct 40 comprises an inlet element 51, which comprises an inlet edge 52 defining the inlet 49 of the air duct 40, an outlet element 54, which comprises an outlet edge 55 defining the outlet 50 of the air duct 40, and an outlet swirler 56.

In the non-limiting example described and shown herein, the inlet element 51 and the outlet element 54 are coupled together. In particular, in the example of FIGS. 3 and 4, the outlet element 54 is keyed onto the inlet element 51 and wraps it for a stretch.

According to a variant not shown, one or more connection elements may be present between the inlet element 51 and the outlet element 54.

The inlet edge 51 has a preferably frusto-conical shape converging along the forward direction D.

In the example shown in FIGS. 3 and 4, the inlet element 51 comprises an inner annular face 58, which defines an inlet portion 59 of the air duct having a constant passage section along the forward direction D.

The outlet element 54 is annular and made of refractory material and is preferably defined by sectors that are assembled together.

The outlet element 54 comprises an inner annular face 60 provided with a first inner portion 61 proximal to the outlet edge 55, which defines an outlet portion 63 of the air duct 40 having an increasing passage section along the forward direction D.

Preferably, the first inner portion 61 of the inner annular face 60 has a frusto-conical shape diverging along the forward direction D.

In particular, the first frusto-conical inner portion 61 is inclined with respect to the axial direction by an angle α comprised between 7° and 15°.

The inner annular face 60 of the outlet element 54 is further provided with a second inner portion 64 which is configured so as to define a constant passage section along the forward direction D. In detail, the second inner portion 64 is arranged upstream of the first portion along the forward direction D.

Preferably, the second inner portion 64 is cylindrical and contiguous to the first inner portion 61.

The outlet element 54 is further provided with a plurality of axial and through seats 66, which, as we will see in detail later, house portions of the main burner 41.

Preferably, the axial seats 66 are aligned along a circular path that surrounds the air duct 40.

More preferably, the axial seats 66 are arranged equidistant from each other.

According to a variant not shown, the seats 66 are arranged along non-axial directions and suitably inclined with respect to the longitudinal axis A (for example converging along the forward direction D or diverging along the forward direction D).

In detail, the outlet element 54 is provided with an outer face 68 comprising a first cylindrical outer portion 69, which is proximal to the outlet edge 55, and a second annular outer portion 70, which extends transversely to the first cylindrical outer portion 69 and is provided with a plurality of holes 72 that define the outlet of the axial seats 66.

Preferably, the outer face 68 of the outlet element 54 also comprises a third outer portion 73, preferably cylindrical, which extends from the second annular outer portion 70 in a direction opposite to the forward direction D.

The third outer portion 73 is coupled to a wall 75 of the boiler 2 (dashed and only partially visible).

The wall 75 of the boiler 2 and the second annular outer portion 70 are therefore arranged substantially flush with each other.

The inlet 49 faces a casing 78, which defines a plenum 79 supplied with air from the air supply duct 22 of the air supply system 18.

Inside the plenum 79 and at the inlet 49, the burner body 17 comprises a perforated pipe 80, which extends mainly externally to the air passage duct 40 and coaxially to the axis A.

Preferably, the perforated pipe 80 extends axially between the inlet 49 and an end wall 81 of the casing 78.

Preferably, a portion of the perforated pipe 80 is arranged within the air duct 40.

In use, the perforated pipe 80 helps to generate vorticity in the air flow passing through the inlet 49 by limiting the amount of air at the centre of the air duct 40.

Preferably, the burner body 17 also comprises an air flow distributing element 84 arranged within the casing 78.

The air flow distributing element 84 is substantially cylindrical, centred on the axis A and arranged about at least a portion of the perforated pipe 80.

In the non-limiting example described and shown herein, the air flow distributing element 84 is fixed to the end wall 81 of the casing 78 and extends around the perforated pipe 80 until it reaches approximately half the axial length of the perforated pipe 80.

Preferably, the air flow distributing element 84 is dimensioned such that the distance between the perforated pipe 80 and the inner wall of the air flow distributing element 84 is such as to cause a homogeneous air distribution effect around the perforated pipe 80.

The outlet swirler 56 is arranged in the outlet portion 63 of the air duct 40 and is supported by an axial conduit 85 that is concentric to the axis A.

The outlet swirler 56 preferably faces the first inner portion 61 of the inner face of the outlet element 54 and is provided with a plurality of blades 86, which extend along respective radial directions and have one end 87a fixed to the axial conduit 85 and one end 87b fixed to an outer support ring 88.

The outer support ring 88 is provided with a substantially cylindrical outer surface 89a, which faces the first inner portion 61 and is preferably provided, along the edge proximal to the outlet 49, with a plurality of teeth 89b which preferably project orthogonal to the outer surface 89a. The teeth 89b are preferably trapezoidal in shape.

In use, the outlet swirler 56 generates, downstream, a low axial velocity zone to stabilize the diffusion flame created by the stabilization burner 43, as we will see later.

In the non-limiting example described and shown herein, a plurality of races 82 project radially from the axial conduit 85, which have a structural function and are fixed to the inlet element 51 of the air duct 40.

The main burner 41 extends around the air duct 40 and comprises a plurality of fuel conduits 90 and a plurality of fuel injection nozzles 91 arranged at an end 92 of the respective fuel conduits 90.

The fuel conduits 90 comprise an end portion 93, which comprises the end 92, and is housed in the seats 66.

Preferably, the fuel conduits 90 are cylindrical.

Each fuel conduit 90 is provided with an end 94 opposite the end 92, which is connected to a respective manifold of the manifolds 34a, 34b and 34c.

The end portion 93 may be made as one piece with the remaining part of the fuel conduit 90 or may be rotatably coupled to the remaining part of the fuel conduit 90.

In the non-limiting example described and shown herein, the end portion 93 is rotatably coupled to the remaining part of the fuel conduit 90 (detail not clearly visible in the accompanying figures). Preferably, the end portion 93 is configured so as to rotate between −45° and 45° around its own axis B.

Preferably, a first group of fuel conduits 90a is connected to the first manifold 34a, a second group of fuel conduits 90b is connected to the second manifold 34b, and a third group of fuel conduits 90b is connected to the third manifold 34b.

The fuel conduits 90a of the first group are preferably interposed to the fuel conduits 90b of the second group and to the fuel conduits 90c of the third group.

In this way, the fuel conduits 90a, 90b and 90c alternate along the circumference along which they are arranged. This allows an equal distribution of the fuels supplied by means of the main burner 41.

In the non-limiting example described and shown herein, the manifolds 34a, 34b and 34c are preferably defined by annular channels 98a, 98b, 98c, which extend externally to the casing 78. Preferably, a wall of the manifolds 34a, 34b and 34c is defined by the wall of the casing 78.

It is understood that, in accordance with a variant not shown, the manifolds 34a, 34b and 34c can be housed in the plenum 79 defined by the casing 78.

In the non-limiting example described and shown herein, the manifolds 34a, 34b and 34c are substantially identical. In accordance with a variant not shown, the manifolds can have different structure and different passage sections.

Each injection nozzle 91 is provided with at least one injection hole 94 (better visible in the enlargement of FIG. 3).

In the non-limiting example described and shown herein, the at least one injection hole 94 is arranged offset from the axis B of the respective end portion 93 of the fuel conduit 90.

In this way, the rotation of the end portion 93 of the respective fuel conduit 90 causes a displacement of the injection hole 94 and a consequent variation in the injection direction through the injection hole 94.

In use, for example depending on the type of fuel supplied, the orientation of the end portion 93 of each fuel conduit 90 may be suitably adjusted so as to obtain an adjustment in the direction of injection of the fuel into the combustion chamber 3 through the injection holes 96.

Preferably, the end portion 93 of each fuel conduit 90 is adjusted during installation of the burner assembly or during ordinary and/or extraordinary maintenance operations.

The stabilization burner 43 is, at least in part, housed in the air duct 40.

The stabilization burner 43 is preferably supplied with natural gas or with gases of known characteristics that are stable over time and is connected to the stabilization line 28.

Preferably, the stabilization burner 43 extends substantially axially within the air duct 40.

In the non-limiting example described and shown herein, the stabilization burner 43 comprises two conduits 95 connected to the stabilization line 28, which extend in the air duct and are provided with a discharge portion 96 provided with a plurality of discharge nozzles 97.

The conduits 95 are preferably arranged on opposite sides with respect to the axial conduit 85.

Preferably, the discharge portion 96 is arranged transverse to the axis A and the discharge nozzles 97 are arranged so as to inject fuel into the air duct 40 in a direction other than the forward direction D.

Preferably, the discharge portion 96 of each conduit 95 is arranged upstream of the outlet swirler 56.

In use, a limited amount of natural gas is injected into the air duct 40 through the stabilization burner 43 to produce, in diffusion mode, a stabilization flame particularly useful during the ignition, heating and full ignition phases.

The injection of a very small portion of fuel into the central part of the burner assembly 4 can be useful for stabilizing the flame when the main burner 41 is supplied with fuels with low calorific value and low reactivity (e.g. waste gas) helping to keep the combustion stable.

Injecting a very small portion of fuel into the central part of the burner assembly 4 may also be useful when the main burner 41 is supplied with standard fuels (e.g. natural gas) because it creates a conventional diffusive combustion zone. Advantageously, in this way the presence of a flame is detectable even when the injection of the fuel into the outer portion can generate a "MILD" type combustion as a result of the demixing with more difficult flame detection.

In the non-limiting example described and shown herein, the burner body 17 further comprises a liquid fuel lance 45, which is also arranged along the air duct 40.

In particular, the liquid fuel lance 45 is preferably arranged in the axial conduit 85 which supports the outlet swirler 56 and is connected to the liquid fuel supply line 29.

In use, the control device 20 regulates the fuel regulating valves 33a, 33b, 33c, the stabilizing fuel regulating valve 31, the liquid fuel regulating valve 32 depending on the availability of fuel and the energy demand to the boiler 2.

In particular, the control device 20 is configured to regulate the opening of the fuel regulating valves 33a, 33b, 33c on the basis of the energy demand of the boiler 2 and on the basis of characteristic parameters of the type of fuel that is supplied through the respective valve (e.g. Wobbe number, fuel pressure, fuel density, fuel calorific value).

In essence, the control device 20 defines the flow rate of each fuel to be supplied to the burner body 17 on the basis of the energy demand of the boiler 2 and on the basis of characteristic parameters of the fuel available.

In particular, the control device 20 regulates the flow rate supplied to the main burner 41, and therefore the opening of the fuel regulating valves 33a, 33b, 33c, on the basis of the following relationship:

$$Q\,coll_{n\text{-}th} = \frac{PT_{n\text{-}th}}{PC_{n\text{-}th}}$$

Where:
Qmanif$_{(n\text{-}th)}$ is the fuel flow rate to be supplied to the n-th manifold
PT$_{(n\text{-}th)}$ is the thermal power required for the fuel supplied to the n-th manifold
PC$_{(n\text{-}th)}$ is the calorific value of the fuel supplied to the n-th manifold The thermal power required for the fuel supplied to the n-th manifold is preferably defined a priori. Preferably, the thermal power demand is distributed among the fuels so that only one of the fuels is supplied to the respective manifold being affected by the variations in thermal power demand, while the other manifolds (n−1) are preferably supplied with an amount of fuel that is substantially constant or subject to variations only in cases of actual need.

In other words, if the n manifolds are all active, one manifold supplies fuel in modulating mode and is affected by variations in thermal power demand, while the other n−1 manifolds supply fuel in substantially constant mode or regulated according to criteria not related to thermal power demand.

The calorific value of the fuel supplied to the n-th manifold is detected upstream of the respective fuel regulating valve 33a 33b 33c.

Alternatively, instead of the calorific value of the fuel supplied to the n-th manifold, it is also possible to consider the Wobbe index, which combines calorific value and density.

Preferably, the control device 20 is also configured to take into account the availability of current fuel and to optionally regulate the thermal power required for the fuel supplied to the n-th manifold $PT_{(n-th)}$ on the basis of actual availabilities. Preferably, the control device 20 detects the availability of fuel based on pressure values detected on the fuel supply lines 30a 30b 30c upstream of the respective fuel regulating valves 33a 33b 33c. In this way, the control device is able to establish the actual availability of the fuels in the network and to regulate the thermal power required for the fuel supplied to the n-th manifold $PT_{(n-th)}$ if this exceeds the actual availability.

The same philosophy is basically adopted in the regulation of the connection valves 37a 37b 37c controlled by the control device 20.

The control device 20, in fact, regulates the opening of the connection valves 37a 37b 37c to selectively put the manifolds 34a, 34b and 34c in connection on the basis of the energy demand of the boiler 2 and on the basis of characteristic data of the fuel present in the respective manifold 34a, 34b and 34c (for example the pressure of the fuel detected by means of pressure sensors 35a 35b 35c arranged downstream of the fuel regulating valves 33a 33b 33c).

The opening of the connection valves 37a, 37b, 37c is carried out in order to obtain a distribution of the fuel on more than one manifold of the manifolds 34a, 34b and 34c and the closing is of course carried out in order to reduce said distribution.

Preferably, the control device 20 is configured to open at least one connection valve of the connection valves 37a 37b 37c on the basis of the pressure values detected by the pressure sensors 35a 35b 35c downstream of the fuel regulating valves 33a 33b 33c.

In particular, if the pressure value detected on a supply line exceeds a threshold value, the opening of at least the connection valve connecting the manifold supplied by said line with a further manifold is carried out.

Similarly, once the opening of the at least one connection valve has been carried out, the closing of said valve will take place when the value of the data detected on the line (in the example considered herein the fuel pressure detected by means of pressure sensors 35a 35b 35c arranged downstream of the fuel regulating valves 33a 33b 33c) is again acceptable. In other words, if the pressure value drops to a second minimum threshold, then the connection valve that had been opened is closed again.

Making a practical example to better understand the mechanism, if the pressure value of the pressure sensor 35a exceeds a certain threshold value, at least one of the connection valves 37a 37c is opened to connect the manifold 34a supplied by the line 30a to a further manifold (34b or 34c).

The opening of a connection valve due to an excess of pressure on one of the connection valve lines will preferably coincide with the closing of the line regulating valve that supplies the manifold shared with the fuel supply line where an excess of pressure has occurred.

Returning to the example described above, then, if the open connection valve is 37a, the valve 33b supplying the manifold 34b is closed.

In this way the manifold 34b is used for the distribution of the first fuel.

In other words, the connection valve 37a is opened to put two fuel manifolds in communication in order to increase the outflow section of the injection nozzles and keep the pressure at the injection nozzles within acceptable limits.

In essence, the connection valves 37a 37b 37c allow any type of fuel to be managed even if it is not stable. Similarly, the opening of the liquid fuel regulating valve 32 is regulated by the control device 20 on the basis of the energy demand of the boiler 2 and on the basis of the availability of liquid fuel and, if required, also on the basis of the indications of the need for fuel disposal (decided by the plant operator). Sometimes, in fact, it is required to dispose of liquid fuel with priority, especially when this represents, for example, a waste produced by the plant.

The stabilizing fuel regulating valve 31, on the other hand, is regulated based on the operating conditions of the burner assembly 4 (i.e. on the basis of the energy demand of the boiler 2) and on the basis of the characteristic parameters of the fuel that is supplied to the main burner 41.

Preferably, the control device 20 is configured to carry out a regulation of the flow rate of the stabilizing fuel based on, for example, the pressure of the fuels supplied to the fuel supply lines 30a 30b 30c. Preferably, the pressure on which the flow rate control of the stabilizing fuel is based is carried out on the basis of the pressure detected upstream of the fuel regulating valves 33a, 33b, 33c.

Preferably, the stabilization burner 43, in fact, is activated in the ignition phases and optionally kept active or reactivated in the event that the characteristics of the fuel (or of the fuels) supplied to the main burner 41 detect particularly lean fuels. The presence of the stabilization burner 43, in these cases, ensures flame stability.

In case the main burner 41 is supplied with particularly reactive fuels (e.g. hydrogen-based) the stabilization burner 43 can be switched off (because it is not necessary) further reducing the overall NOx emissions.

Figure 5:
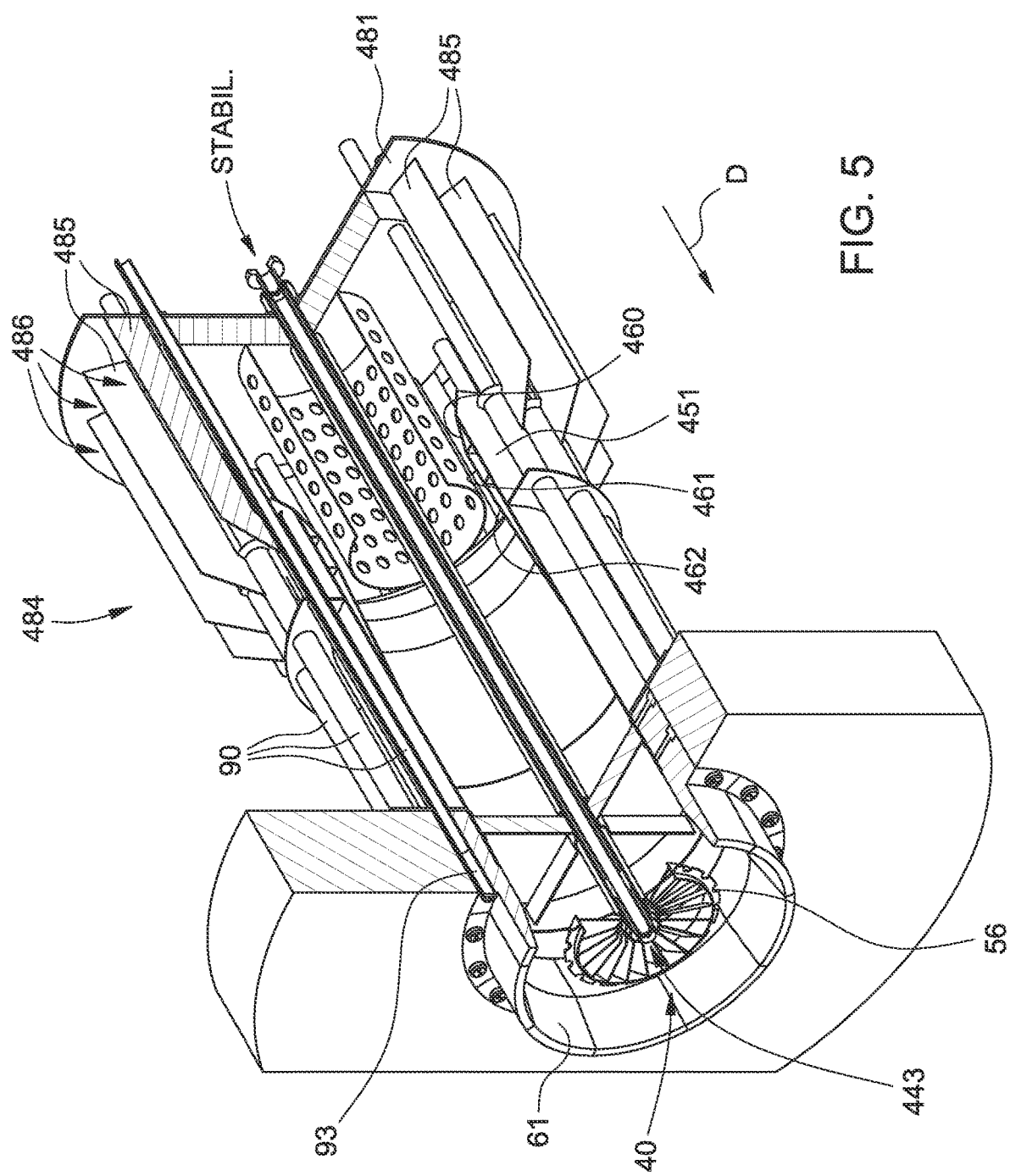
FIG. 5 is a perspective view, with parts in section and parts removed for clarity's sake, of a burner assembly according to the present invention in accordance with an alternative embodiment.

A burner assembly 400 in accordance with a second embodiment is shown in FIGS. 5 and 6.

Hereinafter, the same reference numerals adopted in relation to FIGS. 1-4 will be maintained to indicate identical or similar parts.

The burner assembly 400 has a structure very similar to the burner assembly 4 and differs in some details which we specify hereinbelow.

The burner assembly 400 is devoid of a liquid fuel burner and comprises a stabilization burner 443, which engages the axial conduit 85.

In other words, the stabilization burner 443 injects fuel just downstream of the outlet swirler 56 and in the central position.

The burner assembly 400 is further characterized by a different structure of the casing 478 (schematically represented in FIG. 6 only), and by a different structure of the air flow distributing element 484 arranged within the casing 478.

The casing 478 has a plenum 479 supplied with air from the air supply duct 22 of the air supply system 18.

According to a variant not shown, wherein the boiler is provided with a plurality of burner assemblies, the casing 478 may be dimensioned so as to supply several air ducts of different burner assemblies.

The air flow distributing element 484 has a substantially cylindrical structure and is centred on the axis A. Preferably, the air flow distributing element 484 is fixed to the end wall 481 of the casing 478 and extends axially until it surrounds the inlet 49 of the air duct 40.

The air flow distributing element 484 is defined by a plurality of axial fins 485, among which a plurality of air passages 486 are defined.

Further, the burner assembly 400 differs from the burner assembly 4 by a different aerodynamic conformation of the inlet element 451 of the air duct 40.

The inlet element 451 comprises an inner annular face 458, which defines an inlet portion 459 of the air duct 40 having a variable passage section along the forward direction D.

In particular, the inner annular face 458 of the inlet element 451 is shaped so as to define, along the forward direction D, a decreasing portion 460 having decreasing passage section, a constant portion 461 having constant passage section and an increasing portion 462 having increasing passage section.

Advantageously, the conformation of the inner annular face 458 results in a better air distribution on the outer parts of the air duct 40 thanks to a slight flow acceleration effect.

Although schematically shown in FIG. 6, the burner assembly 400 comprises the fuel supply system 19 provided with the manifolds 34a, 34b and 34c as described and shown with reference to FIG. 2.

Preferably, the manifolds 34a, 34b, and 34c are arranged externally to the casing 478.

Advantageously, the structure of the burner assembly 400 allows the use of fuel conduits 90 that are substantially longitudinal and arranged parallel to the axis A. This allows the adjustment of the position of the nozzles 91 also from the outside of the burner assembly 400 by rotating the fuel conduits 90. The end portions 93 of each fuel conduit 90 are, in this case, integral with the respective fuel conduit 90.

It is understood that the features described above and highlighted as peculiar features of the burner assembly 400 can also be implemented individually in the burner assembly 4.

The burner assembly 4, 400 according to the present invention therefore allows the generation of a demixed type combustion (with MILD characteristics) with low NOx emissions and allows to manage a plurality of fuels with time-varying characteristics.

The main burner 41, in fact, injects fuel into a low-oxygen combustion zone, which surrounds an oxygen-rich combustion zone (i.e. the zone that faces the outlet 49 of the air duct 40 and is supplied by the stabilization burner 43 and optionally by the liquid fuel lance 45).

In this configuration, in essence, the comburent (air) coming from the air duct 40 and the fuel injected from the main burner 41 are substantially decoupled. This triggers an internal discharge gas recirculation (Flue Gas Recirculation) that dilutes the oxygen concentration. Due to the diluted conditions, the injection of fuel by the main burner 41 produces a combustion with significantly reduced temperature levels.

As a result, there is a drastic reduction in thermal NOx emissions.

Advantageously, the burner assembly 4, 400 according to the present invention is able to operate with several different gaseous fuels at the same time, exclusively with high reactivity fuel flows (e.g. 100% hydrogen) or even exclusively with low calorific value fuel flows.

Thanks to the structure of the burner assembly 4, 400 in fact, the combustion of lean gases is supported by the presence of the outlet element 54 in refractory material, which acts as a thermal flywheel to release energy in the case of lean fuels and to absorb energy in the case of fuels with high energy content.

Finally, it is evident that modifications and variations can be made to the burner assembly described herein without departing from the scope of the accompanying claims.

The invention claimed is:

1. A burner assembly for a boiler assembly unit for steam generation; the burner assembly extends along a longitudinal axis and comprises:
   - a plurality of fuel conduits into which, in use, at least one fuel flows in a forward direction;
   - a plurality of fuel injection nozzles, connected to respective fuel conduits for discharging, in use, the fuel into a combustion chamber of the boiler unit;
   - a first manifold connected to a first group of the fuel conduits and to a first fuel source by means of a first supply line provided with a first regulating valve;
   - at least a second manifold connected to a second group of the fuel conduits and to a source of a second fuel by means of a second supply line provided with a second regulating valve; and
   - a control device configured to regulate the first regulating valve and the second regulating valve based on an energy demand of the boiler unit and based on at least one characteristic parameter of the first fuel and/or the second fuel, wherein the at least one characteristic parameter comprises one of calorific value, density and Wobbe index.

2. The burner assembly according to claim 1, comprising an air duct centered along the longitudinal axis, into which, in use, air flows in the forward direction; the air duct being provided with an outlet discharging into the combustion chamber; the fuel injection nozzles being arranged around the air duct.

3. The burner assembly according to claim 1, wherein the outlet of the air duct is arranged downstream of the fuel injection nozzles along the forward direction.

4. The burner assembly according to claim 1, wherein the fuel conduits of the first group are interposed to the fuel conduits of the second group.

5. The burner assembly according to claim 1, comprising at least one first connection line, which connects the first manifold to the at least one second manifold and is provided with a first connection valve; the control device being configured to regulate the first connection valve on the basis of a first data of the first fuel detected on the first supply line downstream of the first regulating valve and/or on the basis of a second data of the second fuel detected on the second supply line downstream of the second regulating valve.

6. The burner assembly according to claim 5, wherein the control device is configured to open the first connection valve if a value of the first data is greater than a first maximum threshold value and/or if a value of the second data is greater than a second maximum threshold value.

7. The burner assembly according to claim 6, wherein the control device is configured to close the second regulating valve if the value of the first data is greater than the first maximum threshold value and/or to close the first regulating valve if the value of the second data is greater than the second maximum threshold value.

8. The burner assembly according to claim 6, wherein the control device is configured to close the first connection valve if the first data and/or the second data is below a minimum threshold value.

9. The burner assembly according to claim 5, wherein the first data is a pressure of the first fuel and the second data is a pressure of the second fuel.

10. The burner assembly according to claim 1, comprising a third manifold connected to a third fuel duct assembly and to a third fuel source via a third supply line provided with a third regulating valve; the control device being configured to also regulate the third regulating valve based on the energy demand of the boiler unit and based on at least one characteristic parameter of the third fuel.

11. The burner assembly according to claim 10, comprising at least one second connection line, which connects the second manifold to the at least one third manifold provided with a second connection valve; the control device being configured to adjust the second connection valve based on a second fuel data detected on the second supply line downstream of the second regulating valve and/or based on a third fuel data detected on the third supply line downstream of the third regulating valve.

12. The burner assembly according to claim 10, comprising at least one third connection line, which connects the first manifold to the at least one third manifold provided with a third connection valve; the control device being configured to regulate the third connection valve on the basis of a first data of the first fuel detected on the first supply line downstream of the first regulating valve and/or on the basis of a third data of the third fuel detected on the third supply line downstream of the third regulating valve.

13. The burner assembly according to claim 11, wherein the third data is a pressure of the third fuel.

14. A bummer assembly for a boiler for the production of steam; the burner assembly extends along a longitudinal axis and comprises:
an air duct centered along the longitudinal axis, in which, in use, air flows in a forward direction; the air duct being provided with an outlet discharging into a combustion chamber of the boiler unit;
a plurality of fuel conduits into which, in use, at least one fuel flows in the forward direction;
a plurality of fuel injection nozzles, arranged around the air duct; each fuel injection nozzle being connected to an end portion of a respective fuel duct for discharging, in use, the fuel into the combustion chamber;
the outlet of the air duct being arranged downstream of the fuel injection nozzles along the forward direction;
the end portion of at least one fuel conduit being rotatable about its own extension axis;
wherein each fuel injection nozzle is provided with at least one injection hole, which is offset with respect to the extension axis of the end portion of the fuel conduit to which the fuel injection nozzle is connected.

15. The burner assembly according to claim 14, wherein the end portion of the fuel conduits is cylindrical.

16. The burner assembly according to claim 14, wherein the end portions of the fuel conduits are arranged along respective parallel directions.

17. The burner assembly according to claim 14, wherein the end portions of the fuel conduits are arranged along the forward direction.

18. The burner assembly of claim 14, wherein the air duct comprises an annular outlet element made of refractory material and provided with an outlet edge defining the outlet of the air duct; the outlet element being provided with a plurality of through seats, in which the respective end portions of the fuel ducts are housed.

19. The burner assembly according to claim 18, wherein the through seats are arranged along a circular path surrounding the air duct.

20. The burner assembly according to claim 18, wherein the through seats are arranged equidistant from each other.

21. The burner assembly according to claim 18, wherein the outlet element is provided with an outer face comprising a first cylindrical outer portion, which is proximal to the outlet edge, and a second annular outer portion, which extends transversely to the first cylindrical outer portion and is provided with a plurality of holes defining an outlet of the through seats.

22. A boiler unit for the production of steam comprising a boiler provided with a combustion chamber and at least one burner assembly of the type claimed in claim 14.

23. A burner assembly for a boiler unit for steam generation; the burner assembly extends along a longitudinal axis and comprises:
a plurality of fuel conduits into which, in use, at least one fuel flows in a forward direction;
a plurality of fuel injection nozzles, connected to respective fuel conduits for discharging, in use, the fuel into a combustion chamber of the boiler unit;
a first manifold connected to a first group of the fuel conduits and to a first fuel source by means of a first supply line provided with a first regulating valve;
at least a second manifold connected to a second group of the fuel conduits and to a source of a second fuel by means of a second supply line provided with a second regulating valve;
a control device configured to regulate the first regulating valve and the second regulating valve based on an energy demand of the boiler unit and based on at least one characteristic parameter of the first fuel and/or the second fuel; and
at least one first connection line, which connects the first manifold to the at least one second manifold and is provided with a first connection valve; the control device being configured to regulate the first connection valve on the basis of a first data of the first fuel detected on the first supply line downstream of the first regulating valve and/or on the basis of a second data of the second fuel detected on the second supply line downstream of the second regulating valve.

24. A burner assembly for a boiler for the production of steam; the burner assembly extends along a longitudinal axis and comprises:
an air duct centered along the axis, in which, in use, air flows in a forward direction; the air duct being provided with an outlet discharging into a combustion chamber of the boiler unit;
a plurality of fuel conduits into which, in use, at least one fuel flows in the forward direction;
a plurality of fuel injection nozzles, arranged around the air duct; each fuel injection nozzle being connected to an end portion of a respective fuel duct for discharging, in use, the fuel into the combustion chamber;
the outlet of the air duct being arranged downstream of the fuel injection nozzles along the forward direction;
the end portion of at least one fuel conduit being rotatable about its own extension axis;
wherein the air duct comprises an annular outlet element made of refractory material and provided with an outlet edge defining the outlet of the air duct; the outlet element being provided with a plurality of through seats, in which the respective end portions of the fuel ducts are housed.

* * * * *